United States Patent
Wang et al.

(10) Patent No.: US 8,339,463 B2
(45) Date of Patent: Dec. 25, 2012

(54) CAMERA LENS CALIBRATION SYSTEM

(75) Inventors: Peng-Kun Wang, New Taipei (TW); Bin Zhang, New Taipei (TW); Ming Shen, New Taipei (TW)

(73) Assignee: Altek Corporation, Hsinchu (TW)

( * ) Notice: Subject to any disclaimer, the term of this patent is extended or adjusted under 35 U.S.C. 154(b) by 57 days.

(21) Appl. No.: 13/181,491

(22) Filed: Jul. 12, 2011

(65) Prior Publication Data

US 2012/0169885 A1   Jul. 5, 2012

(30) Foreign Application Priority Data

Dec. 31, 2010   (TW) .............................. 99147421 A

(51) Int. Cl.
*H04N 17/00*   (2006.01)
(52) U.S. Cl. ...................................................... 348/187
(58) Field of Classification Search .................. 348/187, 348/188, 189, 175, 180, 181
See application file for complete search history.

(56) References Cited

U.S. PATENT DOCUMENTS

| | | | |
|---|---|---|---|
| 7,609,958 B2 * | 10/2009 | Border et al. ................... 396/89 |
| 7,679,645 B2 * | 3/2010 | Takahashi et al. ....... 348/208.11 |
| 8,049,780 B2 * | 11/2011 | Hofmann et al. ............. 348/187 |
| 2007/0188653 A1 * | 8/2007 | Pollock et al. ................ 348/373 |
| 2008/0062164 A1 * | 3/2008 | Bassi et al. .................... 345/214 |
| 2009/0202235 A1 * | 8/2009 | Li et al. ......................... 396/125 |
| 2010/0040355 A1 * | 2/2010 | Craen et al. ..................... 396/90 |
| 2012/0126985 A1 * | 5/2012 | Au et al. ........................ 340/578 |

* cited by examiner

*Primary Examiner* — Paulos M Natnael
(74) *Attorney, Agent, or Firm* — Wang Law Firm, Inc.; Li K. Wang; Stephen Hsu

(57) ABSTRACT

The invention is discloses a camera lens calibration system and method thereof, which comprise a calibration platform, the calibration platform comprise a calibration structure. A calibration camera lens to be calibrated is placed on the calibration platform. An image testing module is provided for capturing a target pattern from a target pattern display through the calibration camera lens to be calibrated for getting an image pattern. The image testing module provides a contrast parameter computation for calculating the contrast parameter of image pattern and showing results on a display.

13 Claims, 5 Drawing Sheets

CAMERA LENS CALIBRATION SYSTEM

FIELD OF THE INVENTION

The exemplary embodiment(s) of the present invention relates to a camera lens calibration system and a method thereof. More specifically, the exemplary embodiment(s) of the present invention relates to a camera lens calibration system and a method thereof which enables the result comparison of the captured contrast values of the image patterns to help calibrate the focus on the camera lens.

BACKGROUND OF THE INVENTION

Ideal camera lens should have the following conditions when imaging:
  a. Dots should be imaged as dots.
  b. Faces right ahead should be imaged perpendicular to optical axis as the right faces.
  c. Object to be shot should be similar to image producing from lens.
  d. Colors of image should be presented true.

Theoretically, neglecting areas outside the optical axis of the imaging face can produce a standard image. However, regular picture taking uses large aperture to have enough light. Focus is not limited to near optical axis area but everywhere on the screen. Thus, due to spherical surface effect of the lens, object point will not be an ideal object point when shooting. Location of focus also differs from different length of optical waves. Image difference from ideal image due to optical limitation is called aberration.

Currently vendors will process many function tests on the camera lens to ensure the camera lens to be sold meet the optical specifications. There are two common camera lens tests in industry: orthogonal projection test and inverse projection.

Please refer to FIG. 1A, wherein the orthogonal projection test is to put a fixed test pattern 100 on the object side of the camera lens to be tested 110. By using camera 120 at the image side to capture the image of the test pattern 100, function of camera lens to be tested 110 can be further determined.

Please also refer to FIG. 1B, wherein the inverse projection test is to produce a mask 140 for the test pattern, irradiate the test pattern by a collimator 130, and project to the projection area 150 by object side of the camera lens to be tested 110. Thus function of the camera lens to be tested can be analyzed by observing the quality of image pattern in the projection area 150.

Currently the camera lens calibration systems and methods comprise:
  1. Diffraction single point focus machine, which is an equipment using the wave property of light to determine the coaxiality of the lens assembly by the quality of the diffraction core image. The disadvantage is that the quality of ambient modular transfer function (MTF) cannot be ensured when focusing. In addition, some of the optical system cannot be focused because the diffraction core image is not sensitive to the relative lens movement.
  2. Using CMOS module and image processing component to analyze pattern and perform comparison by bar transmission mechanism. The disadvantage is the high expense of the CMOS module, computer and bar transmission module for processing image and auto focus function. In addition, the automatic focusing takes a long time. Moreover, it needs manual operation to adjust camera lens after computer data detection. The disadvantage is that the manual operation will require the operator to see the data showing on the computer screen and to adjust the required relative moving distance of X/Y axis of the camera lens platform. It further requires large labor cost and the focus time is too long.

The present methods or devices of focus have the problems of long focus time, high labor cost or high reducing cost. Thus, developer of the present invention considers the disadvantages above and designs a camera lens calibration system to improve the disadvantages of the current technique and increase the application in industry.

SUMMARY

A primary object of the present invention is to provide a camera lens calibration system to solve the problems of long focus time of conventional camera lens calibration machine, high labor cost or high production cost.

According to an object of the present invention, a camera lens calibration system is disclosed, comprising a display module to display a target pattern, a calibration platform to place a camera lens to be calibrated. The camera lens to be calibrated comprises a plurality of lenses of four groups from first to fourth group. The lenses of the first group and the second group are adjacent to the display module and the lenses of the third group comprise at least one shift adjusting core lens driven by a calibration structure to selectively move in horizontal direction. Moreover, the lenses of the fourth group are set behind the third group. The calibration platform further comprises an image testing module comprising an image capturing unit capturing the target pattern by the camera lens to be calibrated to obtain an image pattern, a calculation module performing a contrast parameter computation of the image pattern, and a display screen showing result of the contrast parameter computation calculated by the calculation module.

In the present invention, the contrast parameter computation is to determine contrast uniformity deviation of a plurality of contrast points on the image pattern and show adjustment direction of the adjusting core lens on the display screen. The calibration structure comprises a first axis moving unit to drive the adjusting core lens of the camera lens to be calibrated to move horizontally and a second axis moving unit to drive the adjusting core lens of the camera lens to be calibrated to move vertically. The plurality of contrast points on the image pattern are symmetry to each other.

In the present invention, the lenses of the fourth group are driven by an auto focus device to execute a calibration of vertical position of auto focus. The lenses of the first group and the second group are fixed type. Wherein the calculation module can further use the technique of automatic calibration to calculate the distance to be adjusted of horizontal axis and vertical axis and show on the display screen after calculating the contrast parameter of each of the contrast point.

To have more obvious and easy to understand the improvement of the above mentioned object, technique feature, and practical implementation, Better detailed description examples with associate drawings are presented in the following paragraph.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
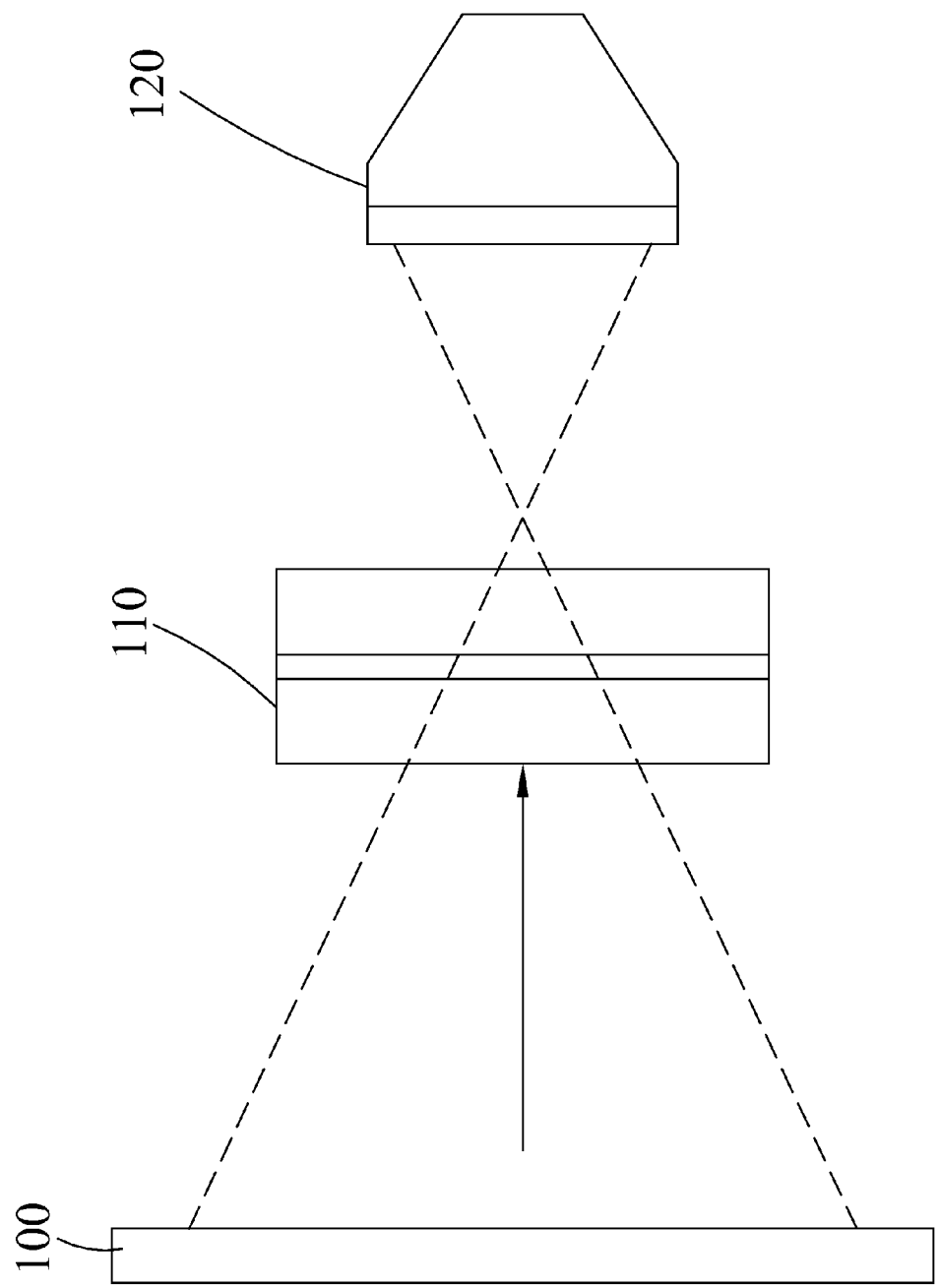
FIG. 1A is a block diagram of a first focus method of a present focus device.
Figure 1B:
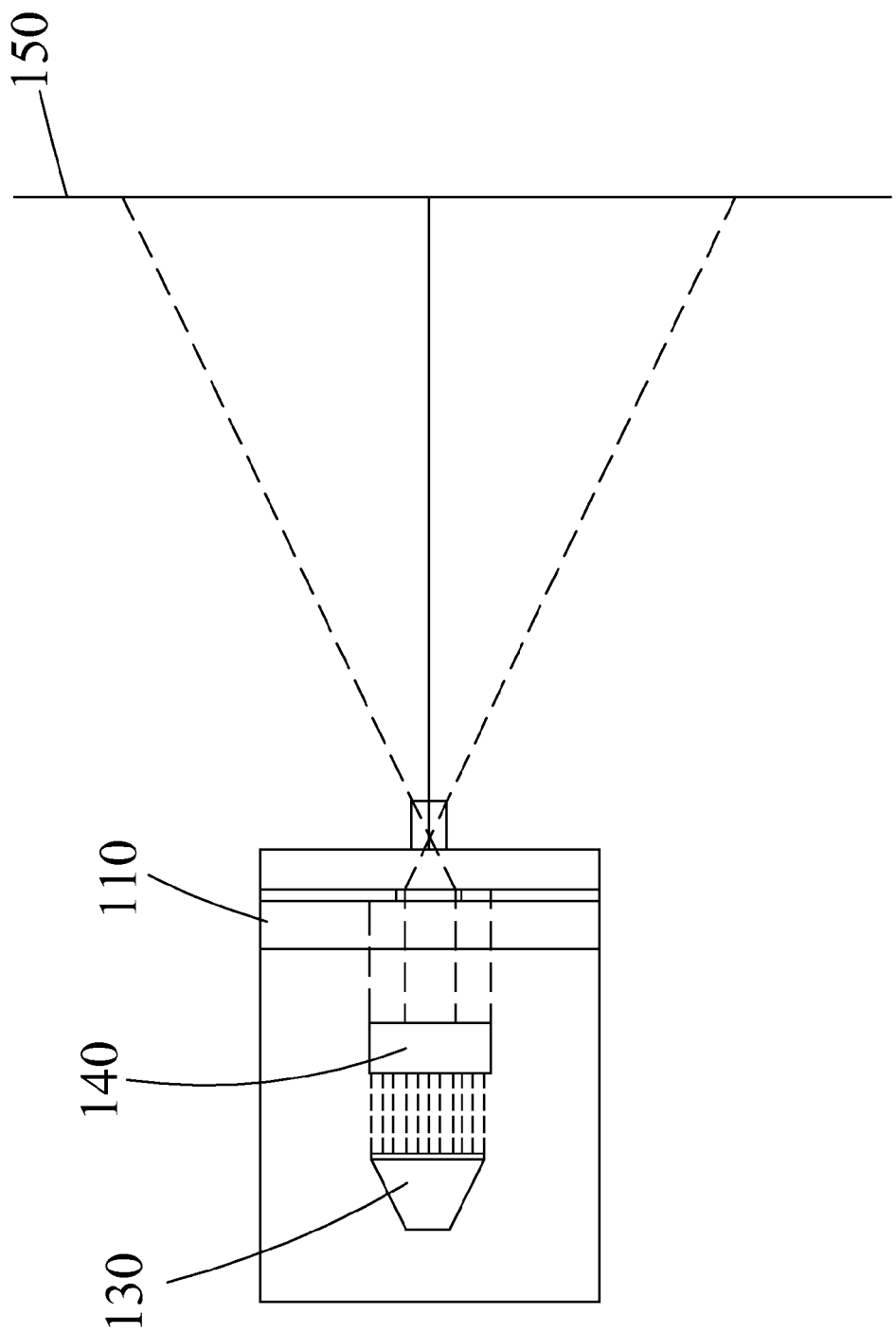
FIG. 1B is a block diagram of a second focus method of a present focus device.

The present invention will now be described with some preferred embodiments thereof and with reference to the accompanying drawings. For the purpose of being easy to understand, elements that are the same in the preferred embodiments are denoted by the same reference numerals. Drawings in the detailed description are to express meaning and assist description, which are not necessary the true proportion and accurate displacement as the embodiment of the present invention. Thus the claim of the embodiment of the present invention is not limited to the proportion and displacement relationship of the attached drawings.

Figure 2:
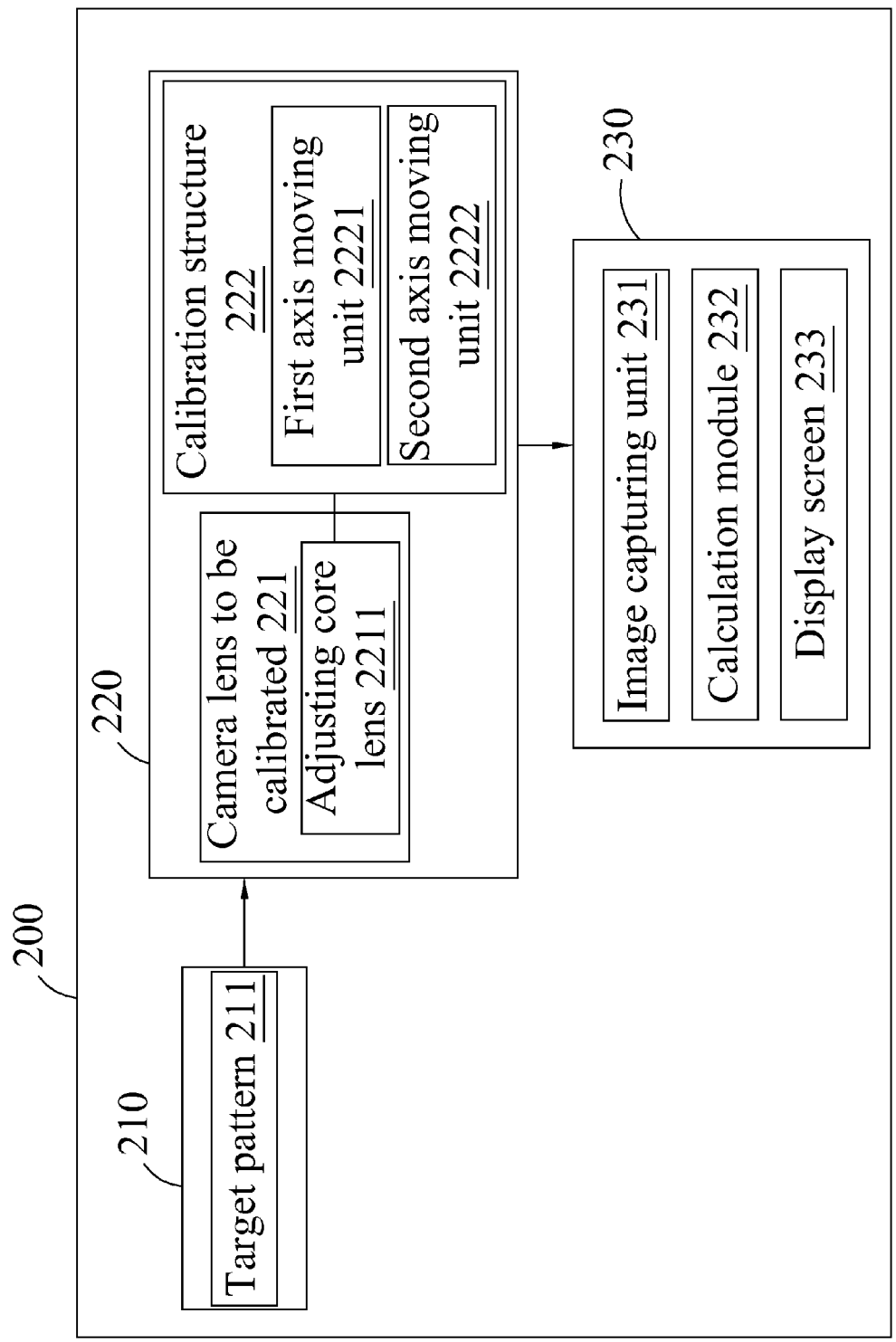
FIG. 2 is a block diagram of a camera lens calibration system according to an embodiment of the present invention.
Figure 3:
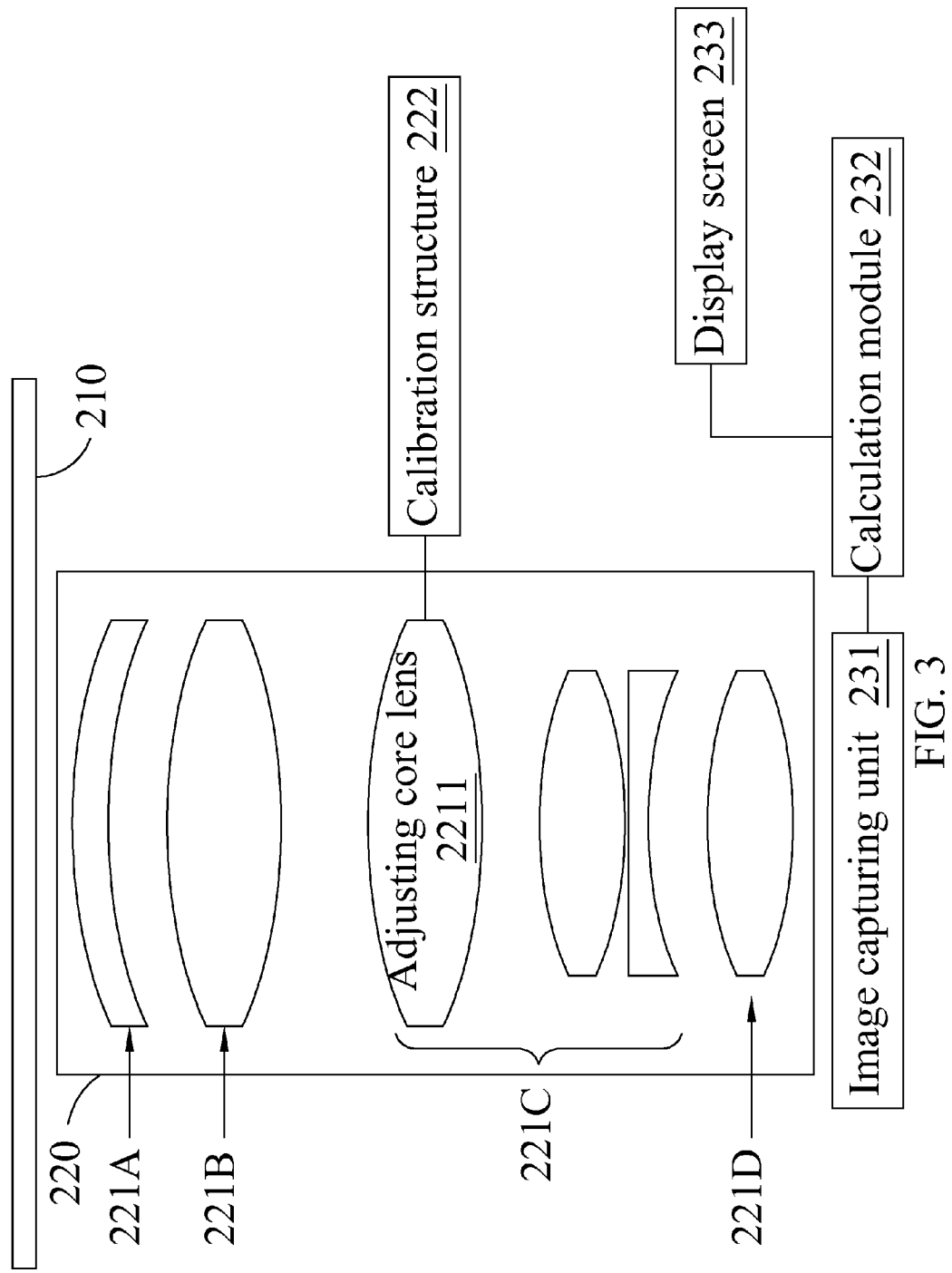
FIG. 3 is a schematic diagram of a camera lens calibration system according to an embodiment of the present invention.

Please refer to FIG. 2 and FIG. 3. FIG. 2 is a block diagram of a camera lens calibration system according to an embodiment of the present invention. FIG. 3 is a schematic diagram of a camera lens calibration system according to an embodiment of the present invention. In FIG. 2, a camera lens calibration system 200 comprises a display module 210, a calibration platform 220 and an image testing module 230.

The display module displays a target pattern 211. A camera lens to be calibrated 221 is placed on the calibration platform 220. The camera lens to be calibrated 221 can be further separated into a plurality of lenses 2211 in first group 211A, a second group 221B, a third group 221C and a fourth group 221D. The lenses of the first group and the second group near the display module 210 are fixed. The lenses of the third group comprise at least a shift adjusting core lens 2211. The adjusting core lens 2211 is driven by a calibration structure 222 to selectively move in horizontal direction. Moreover, the lenses of the fourth group are driven by an auto focus (AF) device to execute a calibration of vertical position of auto focus.

The image testing module 230 comprises an image capturing unit 231, a calculation module 232 and a display screen 233. Considering the optical reasons, the calibration platform 220 are parallel to the display module 210 to ensure a target pattern 211 not to have incidence displacement from the camera lens to be calibrated 221, thus to increase the accuracy of the calibration.

Figure 4:
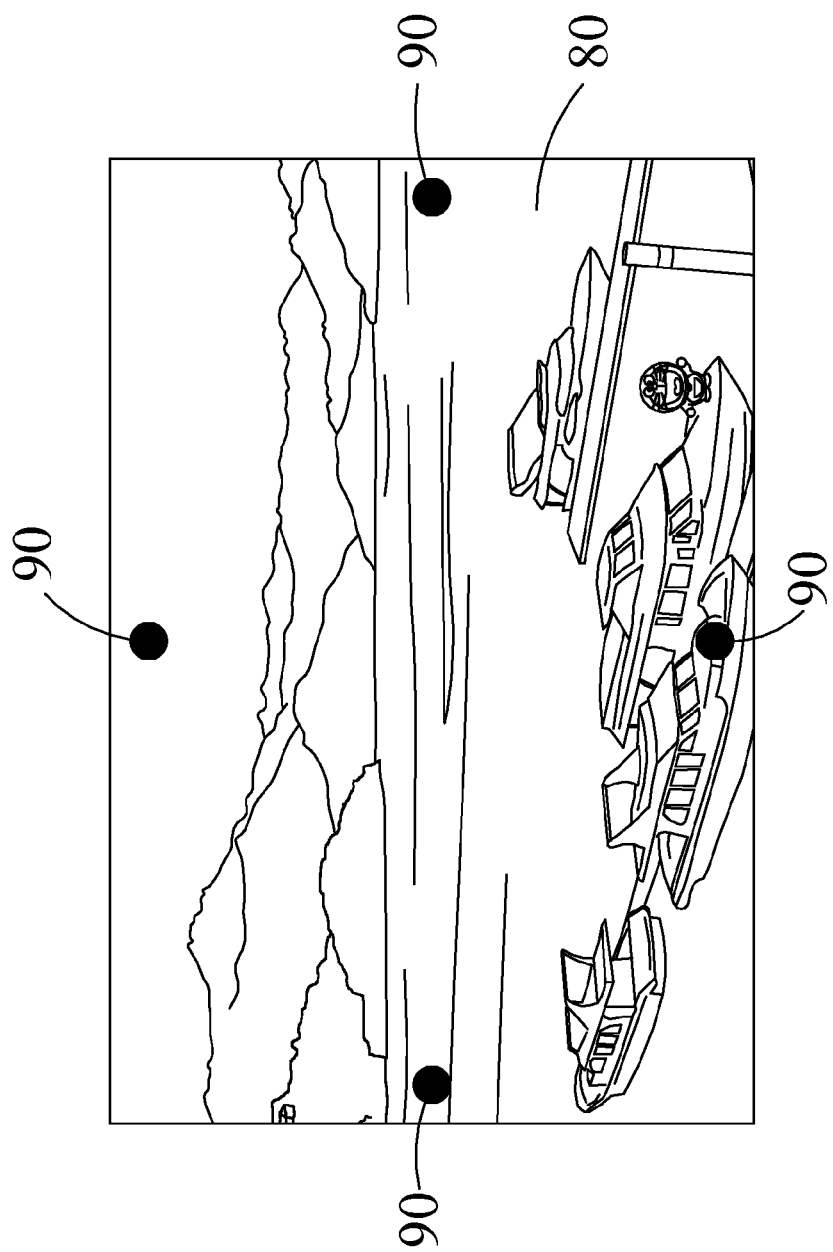
FIG. 4 is a schematic diagram of a camera lens calibration system according to an embodiment of the present invention.

Please also refer to FIG. 4. The image capturing unit 231 captures the target pattern 211 by the camera lens to be calibrated 221 to simulate camera to obtain au image pattern 80. The calculation module 232 performs a contrast parameter computation based on the image pattern 80, calculates the contrast values of a plurality of contrast points 90 that is symmetry to each other on center and surrounding of the image pattern 80, and then shows on the display screen 233. It shows the uniformity deviation of a plurality of contrast points on the image pattern so that the inspection personnel can know clearly the calibration adjustment direction of the adjusting core lens 2211.

In addition, after the calculation module 232 calculates the contrast parameter of each contrast point, it can further use the technique of automatic calibration to calculate the distance to be adjusted of horizontal axis and vertical axis and show on the display screen 233. By this mode, the inspection personnel can further know the distance to be calibrated of the adjusting core lens 2211.

Where in the calibration structure 222 comprises a first axis moving unit 2221 and a second axis moving unit 2222 to provide the user to drive the calibration structure 222 to achieve the purpose of the adjusting core lens 2211 calibration. The first axis moving unit 2221 drives the adjusting core lens 2211 in the camera lens to be calibrated 221 to process a horizontal (X axis) movement. The second axis moving unit 2222 drives the adjusting core lens 2211 in the camera lens to be calibrated 221 to process a vertical (Y axis) movement.

In the embodiment of the present invention, the display module 210 can be a computer screen, a LED display, a rear projection screen or an image changing device. The image capturing unit 231 can be a photosensitive component of CCD or CMOS. The photosensitive component can be a linear type or a facial type.

The display module 210 may be placed in front of the calibration platform 220. In detail, the display module 210 is placed in front of the calibration platform 220 to show the target pattern through the camera lens to be calibrated 221 on the calibration platform 220 and then received by the image testing module 230 behinds the calibration platform to produce the image pattern 80. The contrast parameter computation of a plurality of contrast points 90 on the image pattern 80 are performed so that the inspector can actuate the calibration structure 222 based on the computation results to calibrate the adjusting core lens 2211 on camera lens to be calibrated 221.

In sum, the camera lens calibration system in the embodiment of the present invention adopts automatic contrast computation to assist determination, and adjust the camera lens by the auto focus module, which can solve the problems of long focus time of conventional camera lens calibration machine, high labor cost or high production cost to achieve the effects of accuracy, time reducing and labor cost reducing that current techniques lack. The improvements are easily shown.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A camera lens calibration system, comprising:
   a display module showing a target pattern;
   a calibration platform placing a camera lens to be calibrated which comprises a plurality of lenses from first to fourth group; wherein the lenses of the first group and the second group are adjacent to the display module and the lenses of the third group comprise at least one shift adjusting core lens driven by a calibration structure to selectively move in horizontal direction; wherein the lenses of the fourth group are set behind the third group; and
   an image testing module comprising:
      an image capturing unit capturing the target pattern by using the camera lens to be calibrated to obtain an image pattern;
      a calculation module performing a contrast parameter computation of the image pattern; and
      a display screen showing result of the contrast parameter computation calculated by the calculation module.

2. The camera lens calibration system as recited in claim 1, wherein the contrast parameter computation is to determine contrast uniformity deviation of a plurality of contrast points on the image pattern and show adjustment direction of the adjusting core lens on the display screen.

3. The camera lens calibration system as recited in claim 1, wherein the calibration structure comprising:
   a first axis moving unit driving the adjusting core lens of the camera lens to be calibrated to move horizontally; and
   a second axis moving unit driving the adjusting core lens of the camera lens to be calibrated to move vertically.

4. The camera lens calibration system as recited in claim 2, wherein the calibration structure comprising:
   a first axis moving unit driving the adjusting core lens of the camera lens to be calibrated to move horizontally; and
   a second axis moving unit driving the adjusting core lens of the camera lens to be calibrated to move vertically.

5. The camera lens calibration system as recited in claim 4, wherein the plurality of contrast points on the image pattern are symmetric to each other.

6. The camera lens calibration system as recited in claim 3, wherein the lenses of the fourth group are driven by an auto focus device to execute a calibration of horizontal position of auto focus.

7. The camera lens calibration system as recited in claim 5, wherein the lenses of the fourth group are driven by an auto focus device to execute a calibration of vertical position of auto focus.

8. The camera lens calibration system as recited in claim 3, wherein the lenses of the first group and the second group are fixed type.

9. The camera lens calibration system as recited in claim 5, wherein the lenses of the first group and the second group are fixed type.

10. The camera lens calibration system as recited in claim 3, wherein the calculation module can further use the technique of automatic calibration to directly calculate the distance to be adjusted of horizontal axis and vertical axis and show on the display screen after calculating the contrast parameter of the each contrast point.

11. The camera lens calibration system as recited in claim 5, wherein the calculation module can further use the technique of automatic calibration to calculate the distance to be adjusted of horizontal axis and vertical axis and show on the display screen after calculating the contrast parameter of each of the contrast points.

12. The camera lens calibration system as recited in claim 3, wherein the display module is a computer screen, a LED display, a rear projection screen or an image changing device; wherein the image capturing device is a photosensitive component of CCD or CMOS.

13. The camera lens calibration system as recited in claim 5, wherein the display module is a computer screen, a LED display, a rear projection screen or a image changing device; wherein the image capturing device is a photosensitive component of CCD or CMOS.

* * * * *